(12) United States Patent
Witczak et al.

(10) Patent No.: US 11,767,194 B2
(45) Date of Patent: Sep. 26, 2023

(54) ELEVATOR CAR AND DOOR MOTION MONITORING

(71) Applicant: OTIS ELEVATOR COMPANY, Farmington, CT (US)

(72) Inventors: Tadeusz Pawel Witczak, Farmington, CT (US); Craig Drew Bogli, Avon, CT (US); Derk Oscar Pahlke, Berlin (DE); Nikola Trcka, West Hartford, CT (US); Yrinee Michaelidis, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1251 days.

(21) Appl. No.: 16/258,755

(22) Filed: Jan. 28, 2019

(65) Prior Publication Data

US 2020/0239270 A1 Jul. 30, 2020

(51) Int. Cl.
| | |
|---|---|
| *B66B 1/32* | (2006.01) |
| *B66B 1/22* | (2006.01) |
| *G06F 3/00* | (2006.01) |
| *B66B 13/24* | (2006.01) |
| *B66B 5/00* | (2006.01) |

(52) U.S. Cl.
CPC .............. *B66B 1/32* (2013.01); *B66B 1/22* (2013.01); *B66B 13/24* (2013.01); *G06F 3/00* (2013.01); *B66B 5/00* (2013.01)

(58) Field of Classification Search
CPC .. B66B 1/32; B66B 1/22; B66B 13/24; B66B 5/00; G06F 3/00
See application file for complete search history.

(56) References Cited

U.S. PATENT DOCUMENTS

| | | |
|---|---|---|
| 5,509,505 A | 4/1996 | Steger et al. |
| 5,682,024 A | 10/1997 | Koopman, Jr. et al. |
| 5,821,477 A | 10/1998 | Gerstenkorn |
| 6,435,315 B1 | 8/2002 | Zaharia |
| 6,874,244 B2 | 4/2005 | Birrer et al. |
| 7,004,289 B2 | 2/2006 | Shrum, III et al. |

(Continued)

FOREIGN PATENT DOCUMENTS

| | | |
|---|---|---|
| CN | 107416626 A | 12/2017 |
| CN | 208037763 | 11/2018 |

(Continued)

OTHER PUBLICATIONS

Extended European Search Report for Application No. 19215386.4 dated Jul. 10, 2020.

*Primary Examiner* — Jeffrey Donels

(74) *Attorney, Agent, or Firm* — Carlson, Gaskey & Olds, P.C.

(57) ABSTRACT

An illustrative example elevator sensor device includes at least one sensor supported on a door of an elevator car. The sensor provides an output including an indication of at least movement of the door along at least one axis and movement of the elevator car along at least one axis. A processor associated with the at least one sensor receives the output and determines at least one characteristic of the movement of the door based on the indication of the movement of the door. The processor also determines a location of the elevator car where the movement of the door occurs based on the indication of movement of the elevator car.

19 Claims, 2 Drawing Sheets

(56) References Cited

U.S. PATENT DOCUMENTS

| | | |
|---|---|---|
| 7,571,791 B2 | 8/2009 | Finn et al. |
| 7,699,143 B2 | 4/2010 | Tschuemperlin et al. |
| 8,276,716 B2 | 10/2012 | Meri et al. |
| 8,678,143 B2 * | 3/2014 | Bunter .................. B66B 13/143 |
| | | 187/247 |
| 9,033,114 B2 | 5/2015 | Mizon |
| 9,193,563 B2 | 11/2015 | Arnold et al. |
| 9,567,188 B2 | 2/2017 | Huff et al. |
| 10,040,664 B2 | 8/2018 | Kangas |
| 10,112,801 B2 * | 10/2018 | Madarasz ............. B66B 5/0037 |
| 2011/0168496 A1 * | 7/2011 | Bunter .................. B66B 13/143 |
| | | 187/247 |
| 2013/0099968 A1 | 4/2013 | Katz |
| 2016/0304313 A1 | 10/2016 | Kinnari et al. |
| 2017/0029244 A1 * | 2/2017 | Madarasz ............. B66B 5/0037 |
| 2017/0349399 A1 | 12/2017 | Sonnenmoser et al. |
| 2019/0002238 A1 * | 1/2019 | Bogli .................. B66B 5/0087 |
| 2020/0148504 A1 * | 5/2020 | Pahlke .................. B66B 5/0025 |

FOREIGN PATENT DOCUMENTS

| | | |
|---|---|---|
| EP | 2489621 A1 | 8/2012 |
| EP | 3124417 A1 | 2/2017 |
| JP | WO2020031284 A1 * | 2/2020 |

* cited by examiner

ELEVATOR CAR AND DOOR MOTION MONITORING

BACKGROUND

Elevator systems include elevator cars that move through a hoistway to carry passengers or cargo between different levels of a building. Elevator cars include doors that open and close when the car is parked at a landing to allow an individual to enter or exit the car. Elevator car doors are associated with a number of issues that occur and require maintenance or service personnel to visit the site of the elevator system. Remotely monitoring elevator door functionality facilitates directing appropriate personnel to any sites that require service.

There are known systems for remotely monitoring elevator system performance One drawback associated with some such systems is that they require some integration with the elevator control components. Another example drawback presented by some approaches is that the monitoring hardware can be difficult to install.

SUMMARY

An illustrative example elevator sensor device includes at least one sensor supported on a door of an elevator car. The sensor provides an output including an indication of at least movement of the door along at least one axis and movement of the elevator car along at least one axis. A processor associated with the at least one sensor receives the output and determines at least one characteristic of the movement of the door based on the indication of the movement of the door. The processor also determines a location of the elevator car where the movement of the door occurs based on the indication of movement of the elevator car.

In an example embodiment having one or more features of the sensor device of the previous paragraph, the at least one sensor comprises an accelerometer that senses motion along three perpendicular axes.

In an example embodiment having one or more features of the sensor device of any of the previous paragraphs, the accelerometer is a MEMs accelerometer.

In an example embodiment having one or more features of the sensor device of any of the previous paragraphs, the processor is supported on the door.

In an example embodiment having one or more features of the sensor device of any of the previous paragraphs, the output includes an indication of movement of the door along at least two axes, the movement of the door includes intended movement along one of the two axes, the at least one characteristic includes an indication of any movement of the door along another of the two axes, and the two axes are transverse to each other.

In an example embodiment having one or more features of the sensor device of any of the previous paragraphs, the at least one characteristic includes any vibration of the door during the movement of the door.

In an example embodiment having one or more features of the sensor device of any of the previous paragraphs, the at least one characteristic corresponds to at least one of a smoothness and a consistency of the intended movement along the one of the two axes.

In an example embodiment having one or more features of the sensor device of any of the previous paragraphs, the processor determines the location of the elevator car based on identifying a plurality of landing locations where the elevator car stops after moving in a direction along the at least one axis and where the door moves along at least one of the at least two axes; and determining whether the location of the elevator car corresponds to one of the identified landing locations.

In an example embodiment having one or more features of the sensor device of any of the previous paragraphs, the processor provides an output reporting the location of the elevator car and the at least one characteristic of the movement of the door.

In an example embodiment having one or more features of the sensor device of any of the previous paragraphs, the at least one characteristic is a motion profile corresponding to the movement of the door between closed and open positions.

An illustrative example embodiment of a method includes sensing movement of a door of an elevator car along at least one axis by a sensor supported on the door; sensing movement of the elevator car along at least one axis by the sensor supported on the door; determining at least one characteristic of the movement of the door based on the sensed movement of the door; and determining a location of the elevator car where the movement of the door occurs based on the sensed movement of the elevator car.

In an example embodiment having one or more features of the method of the previous paragraph, the at least one sensor comprises an accelerometer that senses motion along three perpendicular axes.

In an example embodiment having one or more features of the method of any of the previous paragraphs, the accelerometer is a MEMs accelerometer.

In an example embodiment having one or more features of the method of any of the previous paragraphs, sensing the movement of the door includes sensing the movement along at least two axes, the movement of the door includes intended movement along one of the two axes, the at least one characteristic includes an indication of any movement of the door along another of the two axes, and the two axes are transverse to each other.

In an example embodiment having one or more features of the method of any of the previous paragraphs, the at least one characteristic includes any vibration of the door during the movement of the door.

In an example embodiment having one or more features of the method of any of the previous paragraphs, the at least one characteristic corresponds to at least one of a smoothness and a consistency of the intended movement along the one of the two axes.

In an example embodiment having one or more features of the method of any of the previous paragraphs, determining the location of the elevator car comprises identifying a plurality of landing locations where the elevator car stops after moving in a direction along the at least one axis and where the door moves along at least one of the at least two axes; and determining whether the location of the elevator car corresponds to one of the identified landing locations.

An example embodiment having one or more features of the method of any of the previous paragraphs includes reporting the location of the elevator car and the at least one characteristic of the movement of the door to a location remote from a site of the elevator car.

In an example embodiment having one or more features of the method of any of the previous paragraphs, the at least one characteristic is a motion profile corresponding to the movement of the door between closed and open positions.

The various features and advantages of an example embodiment will become apparent to those skilled in the art from the following detailed description. The drawings that accompany the detailed description can be briefly described as follows.

DETAILED DESCRIPTION

Figure 1:
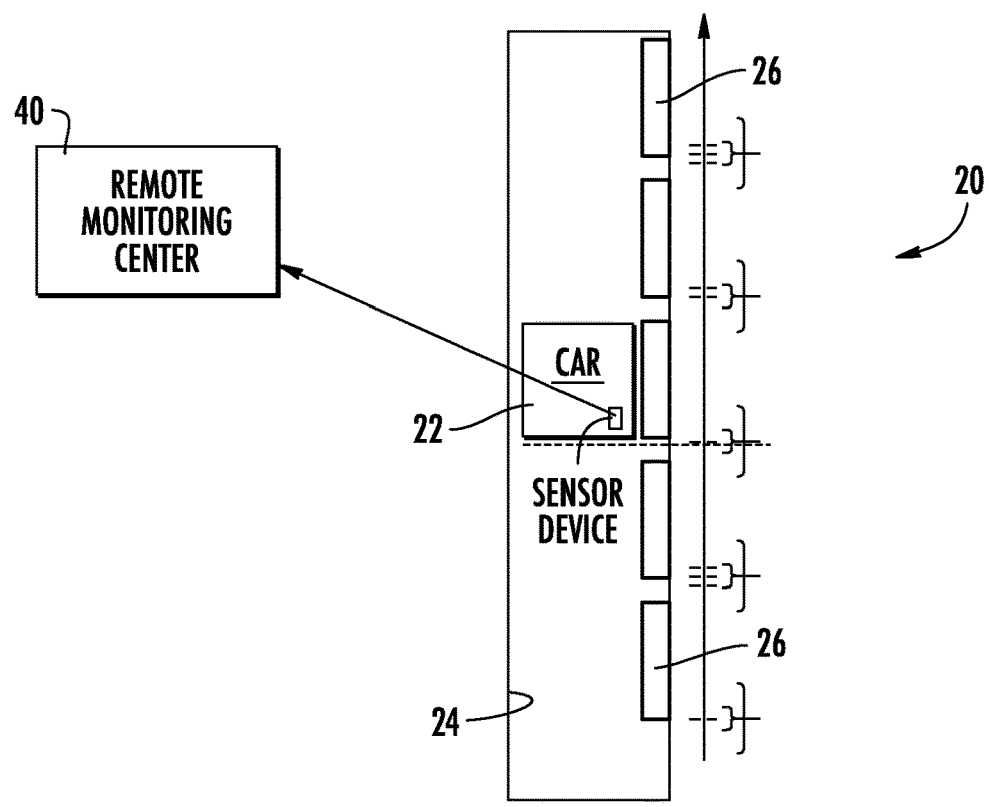
FIG. 1 schematically illustrates selected portions of an elevator system.

FIG. 1 schematically illustrates selected portions of an elevator system 20. An elevator car 22 is situated within a hoistway 24 in a known manner A plurality of landing doors 26 are situated at landings serviced by the elevator car 22.

Figure 2:
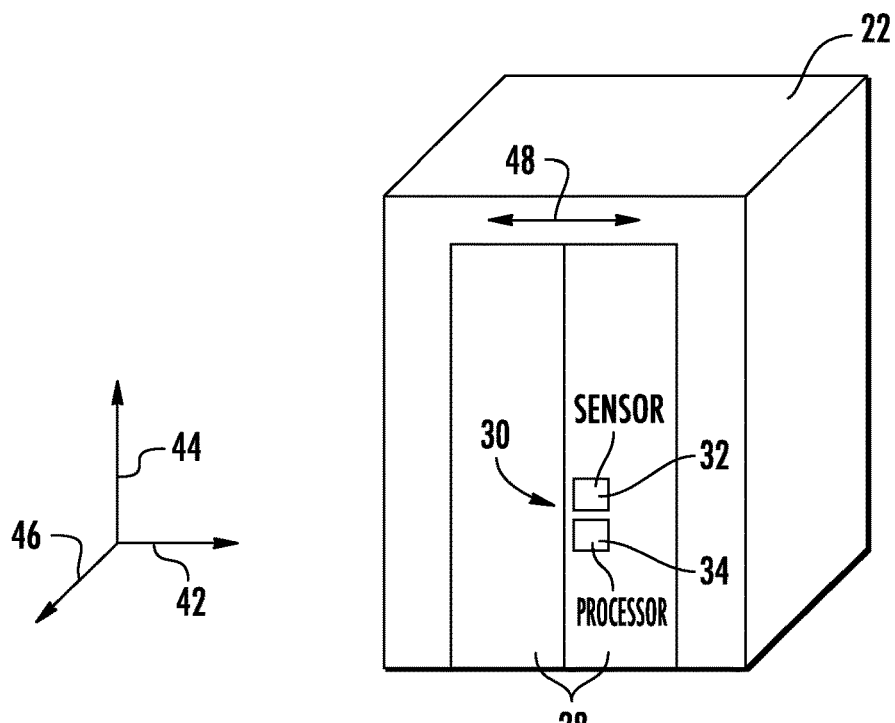
FIG. 2 schematically illustrates selected features of an example elevator car.

As shown in FIG. 2, the elevator car 22 includes doors 28. A sensor device 30 is supported on at least one of the doors 28. Although schematically shown supported on the door panel of the illustrated door 28, the sensor device 30 may be situated on any portion of the door assembly including, for example a door hanger or a door frame. The term "door" as used in this document should be understood to include the entire door system or assembly and not be limited to a particular portion of the door.

The sensor device 30 includes a sensor 32 and a processor 34. The sensor device 30 wirelessly communicates information pertaining to movement of the doors 28 and the elevator car 22, which is provided to a remote monitoring center 40. Although not specifically illustrated, the sensor device 30 may wirelessly communicate with another communication device at the site of the elevator system 20 that is responsible for relaying the information from the sensor device 30 to the remote monitoring center 40 or may communicate directly to the remote monitoring center 40.

The sensor 32 is capable of detecting movement along three axes 42, 44 and 46. The sensor 32 provides an output including an indication of movement of the doors 28 along at least two axes. In the example of FIG. 2, movement along the axis 42 corresponds to movement in a desired direction of door movement as shown at 48. Door movement along the axis 44 or the axis 46 corresponds to vibration or other undesired movement of the doors 28.

The sensor 32 also provides an indication of movement of the elevator car 22 along at least one of the axes. The axis 44 corresponds to vertical movement of the elevator car 22 within the hoistway 24 in the illustrated example. The illustrated example sensor 32 is capable of providing information regarding movement of the elevator car 22 along any of the three axes 42, 44 and 46.

The processor 34 receives the output from the sensor 32 and determines at least one characteristic of the movement of the doors 28. For example, the processor determines whether there was any vibration of the doors 28 during the movement of the doors.

The car doors 28 include a known coupler (not illustrated) so that when the elevator car 22 is situated at one of the landings, the landing doors 26 move with the car doors 28. The output regarding movement of the doors 28 provided by the sensor 32 provides information regarding the corresponding movement of the landing doors 26. Often, if there is a problem with one of the doors of the elevator system 20, it will be associated with one of the landing doors 26, rather than the elevator car doors 28. Of course, there are situations in which one or both of the elevator car doors 28 are not moving smoothly or consistently in a desired manner and the output from the sensor 32 provides an indication of such movement.

The characteristic of door movement in the output provided by the processor 34 in some embodiments corresponds to at least one of the smoothness and consistency of the intended movement of the doors 28 along the axis 42. In some embodiments the characteristic of door movement corresponds to a motion profile describing the movement of the doors 28 between closed and open positions. Such a motion profile may include an indication of acceleration, constant velocity motion, deceleration, vibration, and any other type of motion as the doors 28 travel from a fully closed position to a fully open position and then back again to the fully closed position.

In an example embodiment the sensor 32 is an accelerometer. Some embodiments include a microelectromechanical (MEMs) accelerometer. The processor 34 associated with the sensor 32 is supported on the same elevator car door as the sensor 32. With such a sensor and processor, it is a relatively straightforward or simple task to install the sensor device 30 without requiring any complicated wiring or connections with other portions of the elevator system 20. The sensor device 30 may operate in a transmit-only mode and rely purely upon battery power because it does not require any receiving capability to receive information from other parts of the elevator system 20. This approach provides a low-cost solution to remotely monitor any issues associated with movement of the elevator car 22 and the doors 28 and 26. In embodiments where two-way communication is desired, the sensor device 30 has the capability of receiving information or signals from other devices. Some embodiments include line-based connections to provide power to the sensor device 30 or to facilitate communications between the sensor device 30 and another device.

Another feature of the output from the processor 34 is that it provides an indication of a location of the elevator car 22 where the sensed movement of the car doors 28 occurs. The processor 34 uses information from the sensor 32 regarding movement of the elevator car 22 to determine its position within the hoistway 24. Having information regarding the location of the elevator car 22 allows for identifying a specific landing where a door-related problem occurs so that maintenance personnel dispatched to the site of the elevator system 20 can more efficiently and economically address the issue.

Figure 3:
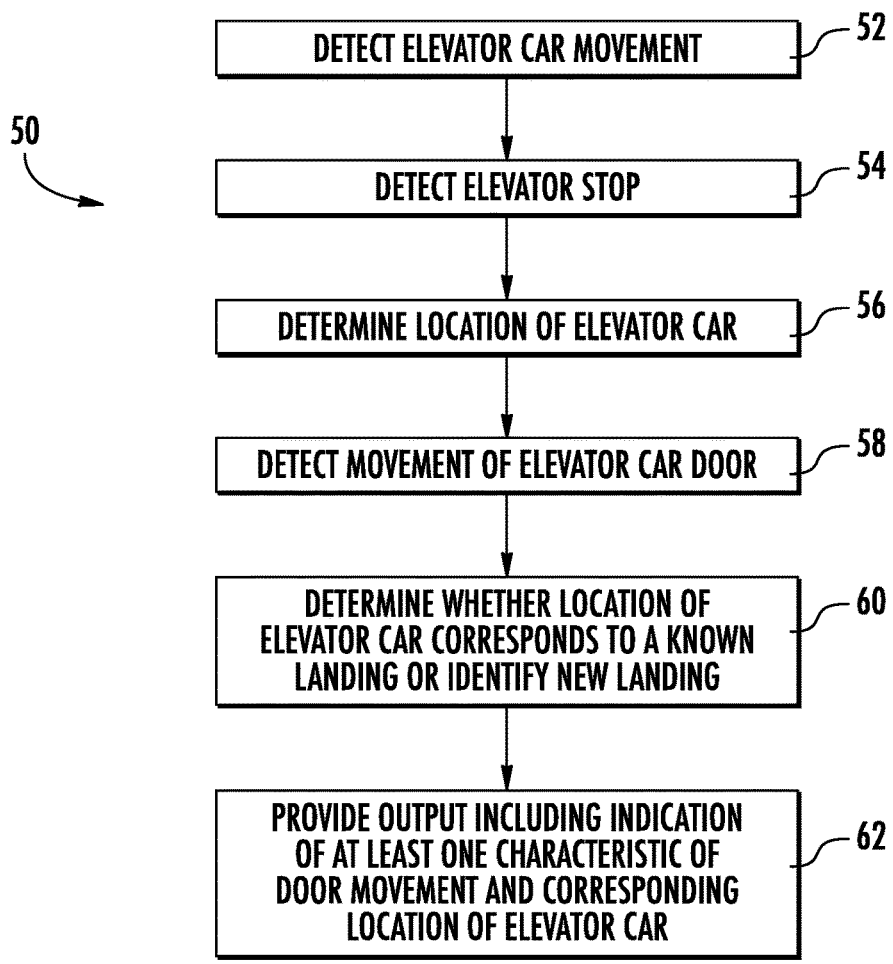
FIG. 3 is a flowchart diagram summarizing an example monitoring approach.

FIG. 3 is a flowchart diagram 50 summarizing an example approach of monitoring the elevator system 20 and incorporating location or position information into the output regarding the sensed movement. At 52, the sensor 32 detects elevator car movement, for example, along the axis 44. At 54, the sensor 32 detects that the elevator car 22 has stopped. At 56, the processor 34 determines a location of the elevator car 22 while it is stopped.

The example embodiment includes accommodations for slight variations in the parked or stopped position of the elevator car 22 at a landing. For example, the car may not be exactly leveled during one stop when the location of the elevator car 22 is determined and during another stop it may be exactly level. The processor 34 is configured or suitably programmed to allow for differences in stop positions within predetermined ranges to be considered as the same landing or parking position.

During some stops, the elevator car doors 28 will open. In FIG. 3 at 58, the sensor device 30 detects movement of the elevator car doors 28. When there is car door movement, the processor 34 determines whether the current location of the elevator car 22 corresponds to a known landing at 60. If the current position of the elevator car does not correspond to a known landing, the processor 34 identifies that location as another landing along the hoistway 24. At 62, the processor 34 provides an output including an indication of at least one characteristic of the door movement and a corresponding location of the elevator car 22. That output provided at 62 may be communicated to the remote monitoring sensor 40 where it is available for further analysis.

Figure 4:
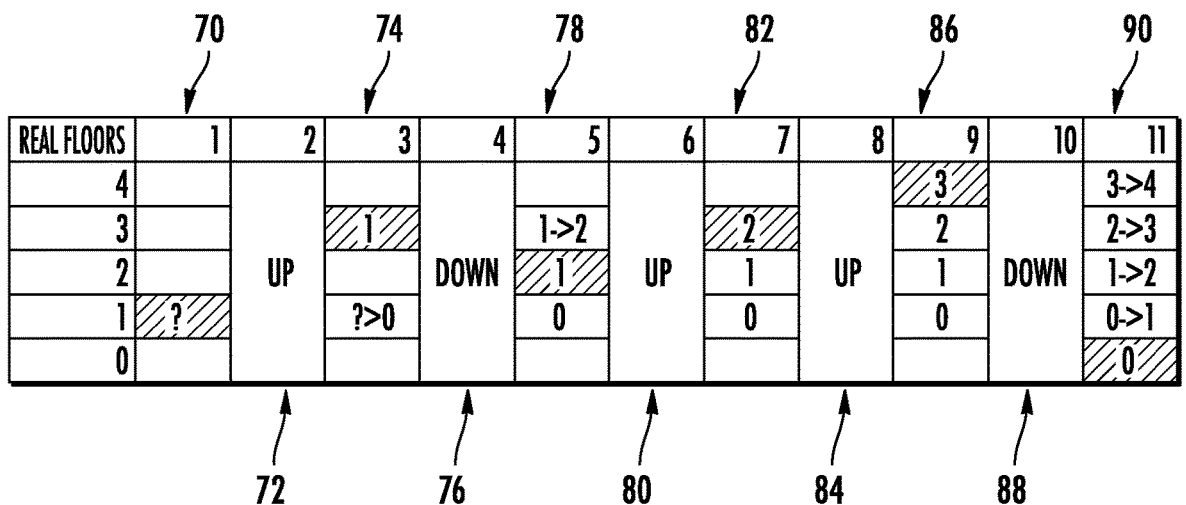
FIG. 4 graphically illustrates a floor mapping strategy.

One aspect of the illustrated example sensor device 30 is that it does not require external information for purposes of being capable of determining the elevator car position. FIG. 4 schematically illustrates a logical flow for identifying landings along the hoistway 24. In this example, there are five actual landings along the hoistway 24. The elevator car 22 begins at a position relatively low in the hoistway corresponding to the second landing from the bottom of the hoistway 24, which may be a first floor or ground floor of a building. This position of the elevator car is shown at 70 in FIG. 4. As indicated at 72, the elevator car 22 travels upward in the hoistway 24 and stops at a location indicated at 74 corresponding to the third floor of the building. Since that location is higher than the location shown at 70, the sensor 32 will generate an output indicating upward movement along the axis 44. The processor 34 receives that output from the sensor 32 and automatically assigns a first floor landing designation to that location and assigns a basement or lower level designation to the originally parked position. Then at 76, the elevator car 22 travels down and stops at a new location between those that have been already identified. The car doors 28 open at this location indicating that it is a landing. Since the location shown at 78 where the elevator car 22 is now parked is between the two previously identified landings, it is assigned the first floor designation and the location previously identified as the first floor at 74 is changed to be identified as the second floor. At 80, the elevator car 22 moves upward again and stops at the location that is now identified as the second floor as shown at 82 in FIG. 4. From that location as shown at 84, the elevator car 22 travels upward and stops at a higher location shown at 86. As this is the highest location currently known to the processor 34, it assigns a higher floor designation than the highest one previously identified. At 86, the current location of the elevator car is assigned a third floor landing designation. At 88, the elevator car 22 moves downward and stops at the lowest level as shown at 90 in FIG. 4. This is a new location to the processor 34 so it identifies that location as the basement or lower level having a designation zero in FIG. 4. Each of the landings above that position has its designation increased by one.

Any further stops of the elevator car 22 at any of the landings represented in FIG. 4 will be a stop at a location of an identified landing. The processor 34 need not update any information under those circumstances.

This approach to identifying landings along the hoistway 24 may be completed by the processor 34 supported on the elevator car door 28 without requiring any external input to the sensor device 30. Instead, the motion information from the sensor 32 allows the processor 34 to make determinations regarding the location of the elevator car 22 relative to any previously identified locations.

Another feature of the illustrated example embodiment is that when the elevator car 22 or the elevator car doors 28 are in a known condition, the processor 34 may observe the output from the sensor 32 and remove any bias or offset along an appropriate one of the axes 42, 44 or 46. For example, when the elevator car is parked at a landing and remains stationary, any offset in the vertical direction may be removed. Appropriate conditions for removing any offset in the directions corresponding to the other axes 42 and 46 are useful for eliminating any offset or drift in those directions.

One feature of the illustrated example arrangement is that it allows for remotely monitoring an elevator system including identifying specific elevator door movement characteristics at specific locations along the hoistway 24. A single sensor device 30 supported on an elevator car door provides information regarding elevator car door movement and elevator car movement. The wireless communication and battery powered features make the example approach economical and efficient.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator sensor device, comprising:
   at least one sensor supported on a door of an elevator car such that the at least one sensor moves with the door as the door moves relative to another portion of the elevator car, the at least one sensor providing an output including an indication of at least movement of the door along at least one axis and movement of the elevator car along at least one axis; and
   a processor associated with the at least one sensor, wherein the processor is supported on the door, and the processor receiving the output and determining at least one characteristic of the movement of the door based on the indication of the movement of the door, the processor determining a location of the elevator car where the movement of the door occurs based on the indication of movement of the elevator car.

2. The elevator sensor device of claim 1, wherein the at least one sensor comprises an accelerometer that senses motion along three perpendicular axes.

3. The elevator sensor device of claim 2, wherein the accelerometer is a MEMs accelerometer.

4. The elevator sensor device of claim 1, wherein
   the output includes an indication of movement of the door along at least two axes;
   the movement of the door includes intended movement along one of the two axes;
   the at least one characteristic includes an indication of any movement of the door along another of the two axes; and
   the two axes are transverse to each other.

5. The elevator sensor device of claim 4, wherein the at least one characteristic includes any vibration of the door during the movement of the door.

6. The elevator sensor device of claim 4, wherein the at least one characteristic corresponds to at least one of a smoothness and a consistency of the intended movement along the one of the two axes.

7. The elevator sensor device of claim 1, wherein the processor determines the location of the elevator car based on
   identifying a plurality of landing locations where the elevator car stops after moving in a direction along the at least one axis and where the door moves along the at least one axis; and determining whether the location of the elevator car corresponds to one of the identified landing locations.

8. The elevator sensor device of claim 7, wherein the processor provides an output reporting the location of the elevator car and the at least one characteristic of the movement of the door.

9. The elevator sensor device of claim 1, wherein the at least one characteristic is a motion profile corresponding to the movement of the door between closed and open positions.

10. A method, comprising:
sensing movement of a door of an elevator car along at least one axis by a sensor supported on the door such that the sensor moves with the door as the door moves relative to another portion of the elevator car;
sensing movement of the elevator car along at least one axis by the sensor supported on the door;
supporting a processor on the door, the processor determining at least one characteristic of the movement of the door based on sensed movement of the door; and
the processor determining a location of the elevator car where the movement of the door occurs based on the sensed movement of the elevator car.

11. The method of claim 10, wherein the sensor comprises an accelerometer that senses motion along three perpendicular axes.

12. The method of claim 11, wherein the accelerometer is a MEMs accelerometer.

13. The method of claim 10, wherein
sensing the movement of the door comprises sensing the movement along at least two axes;
the movement of the door includes intended movement along one of the two axes;
the at least one characteristic includes an indication of any movement of the door along another of the two axes; and
the two axes are transverse to each other.

14. The method of claim 13, wherein the at least one characteristic includes any vibration of the door during the movement of the door.

15. The method of claim 13, wherein the at least one characteristic corresponds to at least one of a smoothness and a consistency of the intended movement along the one of the two axes.

16. The method of claim 10, wherein determining the location of the elevator car comprises
identifying a plurality of landing locations where the elevator car stops after moving in a direction along at least one axis and where the door moves along at least one axis; and
determining whether the location of the elevator car corresponds to one of the identified landing locations.

17. The method of claim 16, comprising reporting the location of the elevator car and the at least one characteristic of the movement of the door to a location remote from a site of the elevator car.

18. The method of claim 10, wherein the at least one characteristic is a motion profile corresponding to the movement of the door between closed and open positions.

19. The elevator sensor device of claim 1, wherein
the at least one sensor comprises an accelerometer that senses motion along three perpendicular axes;
the output includes an indication of movement of the door along at least two axes; and
the processor determines the location of the elevator car based on
identifying a plurality of landing locations where the elevator car stops after moving in a direction along the at least one axis and where the door moves along at least one of the at least two axes, and
determining whether the location of the elevator car corresponds to one of the identified landing locations.

* * * * *